United States Patent
Okano et al.

(10) Patent No.: US 9,502,945 B2
(45) Date of Patent: Nov. 22, 2016

(54) COOLING STRUCTURE FOR ELECTRIC MOTOR

(71) Applicant: NISSAN MOTOR CO., LTD., Yokohama-shi, Kanagawa (JP)

(72) Inventors: Youji Okano, Kawasaki (JP); Toshiaki Tanno, Kawasaki (JP); Hirokazu Matsuzaki, Yamato (JP); Takenari Okuyama, Zama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/429,968

(22) PCT Filed: Aug. 7, 2013

(86) PCT No.: PCT/JP2013/071335
§ 371 (c)(1),
(2) Date: Mar. 20, 2015

(87) PCT Pub. No.: WO2014/045747
PCT Pub. Date: Mar. 27, 2014

(65) Prior Publication Data
US 2015/0244242 A1    Aug. 27, 2015

(30) Foreign Application Priority Data

Sep. 21, 2012  (JP) ................. 2012-208456

(51) Int. Cl.
*H02K 5/22* (2006.01)
*H02K 9/193* (2006.01)
*H02K 5/20* (2006.01)
*H02K 9/19* (2006.01)

(52) U.S. Cl.
CPC ............... *H02K 9/193* (2013.01); *H02K 5/20* (2013.01); *H02K 5/225* (2013.01); *H02K 9/19* (2013.01); *H02K 11/33* (2016.01)

(58) Field of Classification Search
CPC ............................. H02K 5/225; H02K 9/103
USPC ............................................ 310/71, 89, 54
See application file for complete search history.

(56) References Cited

U.S. PATENT DOCUMENTS

| | | | | |
|---|---|---|---|---|
| 4,922,148 A | * | 5/1990 | Kitamura | H02K 11/046 123/41.31 |
| 5,491,370 A | * | 2/1996 | Schneider | H02K 11/0073 310/54 |
| 7,288,866 B2 | * | 10/2007 | Kuribayashi | H02K 5/225 310/71 |
| 8,362,665 B2 | * | 1/2013 | Chamberlin | H02K 5/225 310/54 |
| 2005/0285457 A1 | | 12/2005 | Tsutsui et al. | |
| 2012/0223601 A1 | | 9/2012 | Akuta | |
| 2013/0049495 A1 | | 2/2013 | Matsuo | |

FOREIGN PATENT DOCUMENTS

| | | |
|---|---|---|
| JP | 09-014266 A | 1/1997 |
| JP | 2006-014438 A | 1/2006 |

(Continued)

*Primary Examiner* — Naishadh Desai
(74) *Attorney, Agent, or Firm* — Foley & Lardner LLP

(57) ABSTRACT

A cooling structure for an electric motor includes: a motor case that houses a stator and a rotor therein, a groove opened on an end surface in an axis direction of the rotor being formed in the motor case; a motor control circuit attached to the motor case; and a terminal base that closes the groove to constitute the groove as a cooling water passage through which cooling water can flow, the terminal base connecting a power line of the motor to a power line of the motor control circuit.

10 Claims, 7 Drawing Sheets

(56) References Cited

FOREIGN PATENT DOCUMENTS

| JP | 2006-014452 | A | 1/2006 |
| JP | 2010-268633 | A | 11/2010 |
| JP | 2011-182480 | A | 9/2011 |
| JP | 2012-244700 | A | 12/2012 |

* cited by examiner

COOLING STRUCTURE FOR ELECTRIC MOTOR

TECHNICAL FIELD

The present invention relates to a cooling structure for an electric motor.

BACKGROUND ART

In order to miniaturize a unit, a structure in which a motor control circuit (inverter) is integrated with an electric motor is known. In such a structure, since a power line for connecting the motor and the inverter is short, heat from a motor coil is easily conducted to the inverter via the power line. There is a possibility that a semiconductor element within the inverter is broken down in a case where the amount of conducted heat becomes larger.

Therefore, JP2010-268633A discloses a structure for cooling a power line. Specifically, a terminal base that connects an inverter power line to a motor power line is connected to a cooler in which a water passage is incorporated via an L-shaped heat transfer member. One flat plate part (a first flat plate part) of the L-shaped heat transfer member is adhered and fixed to a surface of the cooler that is separated from the water passage. A second flat plate part that is orthogonal to the first flat plate part is adhered and fixed to the terminal base. The inverter power line is fastened by a bolt to the terminal base so as to sandwich the second flat plate part therebetween.

SUMMARY OF INVENTION

In the structure disclosed in JP2010-268633A, since the cooler and the terminal base are connected via the L-shaped heat transfer member, tolerance of each part must be strictly controlled. Even though the tolerance is strictly controlled, there is a possibility that a gap is formed between the cooler and the first flat plate part or between the terminal base and the second flat plate part due to variation in accuracy of the part. In a case where a gap is formed, thermal resistance conducted from the surface of the cooler to the terminal base increases and cooling performance of the power line connected to the terminal base is deteriorated. Thus, there is a possibility that heat from the motor coil is conducted to the motor control circuit via the power line.

The present invention has been made by focusing on the conventional problems described above. It is an object of the present invention to provide a cooling structure for an electric motor in which heat from a motor coil is hardly conducted to a motor control circuit via a power line even though the motor control circuit is integrated in the electric motor.

According to one aspect of the present invention, a cooling structure for an electric motor includes: a motor case that houses a stator and a rotor therein, a groove opened on an end surface in an axis direction of the rotor being formed in the motor case; and a motor control circuit attached to the motor case. The cooling structure for the electric motor further includes a terminal base that closes the groove to constitute the groove as a cooling water passage through which cooling water can flow, the terminal base connecting a power line of the motor to a power line of the motor control circuit.

DESCRIPTION OF EMBODIMENTS

Hereinafter, embodiments of the present invention will be described below with reference to the accompanying drawings.

First Embodiment

Figure 1:
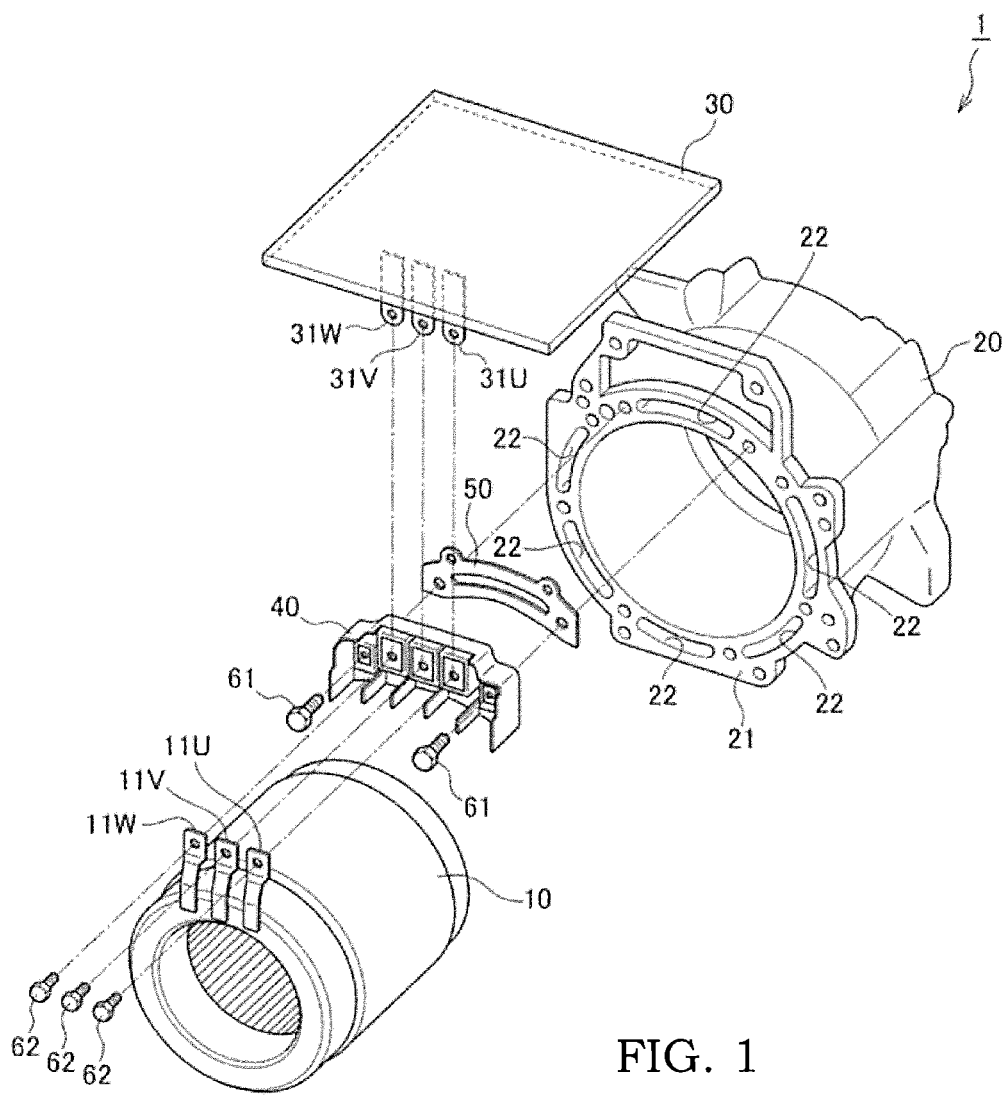
FIG. 1 is a perspective view illustrating major parts of a cooling structure for an electric motor according to the present invention.

FIG. 1 is a perspective view illustrating major parts of a cooling structure for an electric motor according to the present invention.

A cooling structure 1 for an electric motor according to the present invention mainly includes a stator 10, a motor case 20, an inverter 30, and a terminal base 40.

The stator 10 is housed in the motor case 20 together with a rotor (not shown in the drawings). The stator 10 includes a U-phase motor power line 11U, a V-phase motor power line 11V, and a W-phase motor power line 11W. These motor power lines extend toward the inverter 30. In FIG. 1, since the inverter 30 is arranged above the motor case 20, these motor power lines extend upward. Further, as will be described later, the U-phase motor power line 11U is connected to a U-phase inverter power line 31U at the terminal base 40. The V-phase motor power line 11V is connected to a V-phase inverter power line 31V at the terminal base 40. The W-phase motor power line 11W is connected to a W-phase inverter power line 31W at the terminal base 40. When three-phase alternating current power is supplied from the inverter 30 to the stator 10, the rotor rotates. To the contrary, when the rotor rotates, rotary force thereof flows into the inverter 30 as regenerated power.

The motor case 20 houses the stator 10 and the rotor (not shown in the drawings). The motor case 20 has a substantially cylindrical shape. Grooves 22 that are opened on an end surface 21 in a direction of an axis of rotation of the rotor are dug on the motor case 20. Cooling water for cooling the electric motor flows into these grooves 22. In this regard, although each groove 22 is formed so as to have a predetermined length in a circumferential direction of the motor case 20 in FIG. 1, holes that penetrate the motor case 20 in the axis direction of the rotor are formed continuously with the grooves 22. Since they are formed in this manner, the cooling water that flows in from an inlet flows in a loop from the inlet→the circumferential direction→the axial direction→the circumferential direction of an opposite surface→the axial direction→ . . . , and then flows out from an outlet.

The inverter 30 is a circuit that controls the motor. The inverter 30 converts direct current power of a battery (not shown in the drawings) into three-phase alternating current power to supply the converted alternating current power to the motor. The inverter 30 also converts regenerated power (three-phase alternating current power) generated by means of the rotary force of the rotor into direct current power to supply the converted direct current power to the battery (not shown in the drawings). The inverter 30 includes the U-phase inverter power line 31U, the V-phase inverter power line 31V, and the W-phase inverter power line 31W. These inverter power lines extend toward the motor (stator 10). In FIG. 1, these inverter power lines extend downward.

The terminal base 40 is attached to the end surface 21 of the motor case 20 so as to sandwich a seal member 50 therebetween. In the present embodiment, the terminal base 40 is fastened to the motor case 20 by means of bolts 61 in the direction of the axis of rotation of the rotor. In this regard, the seal member 50 has a shape that surrounds the periphery of the groove 22 which is opened on the motor case 20.

Figure 2:
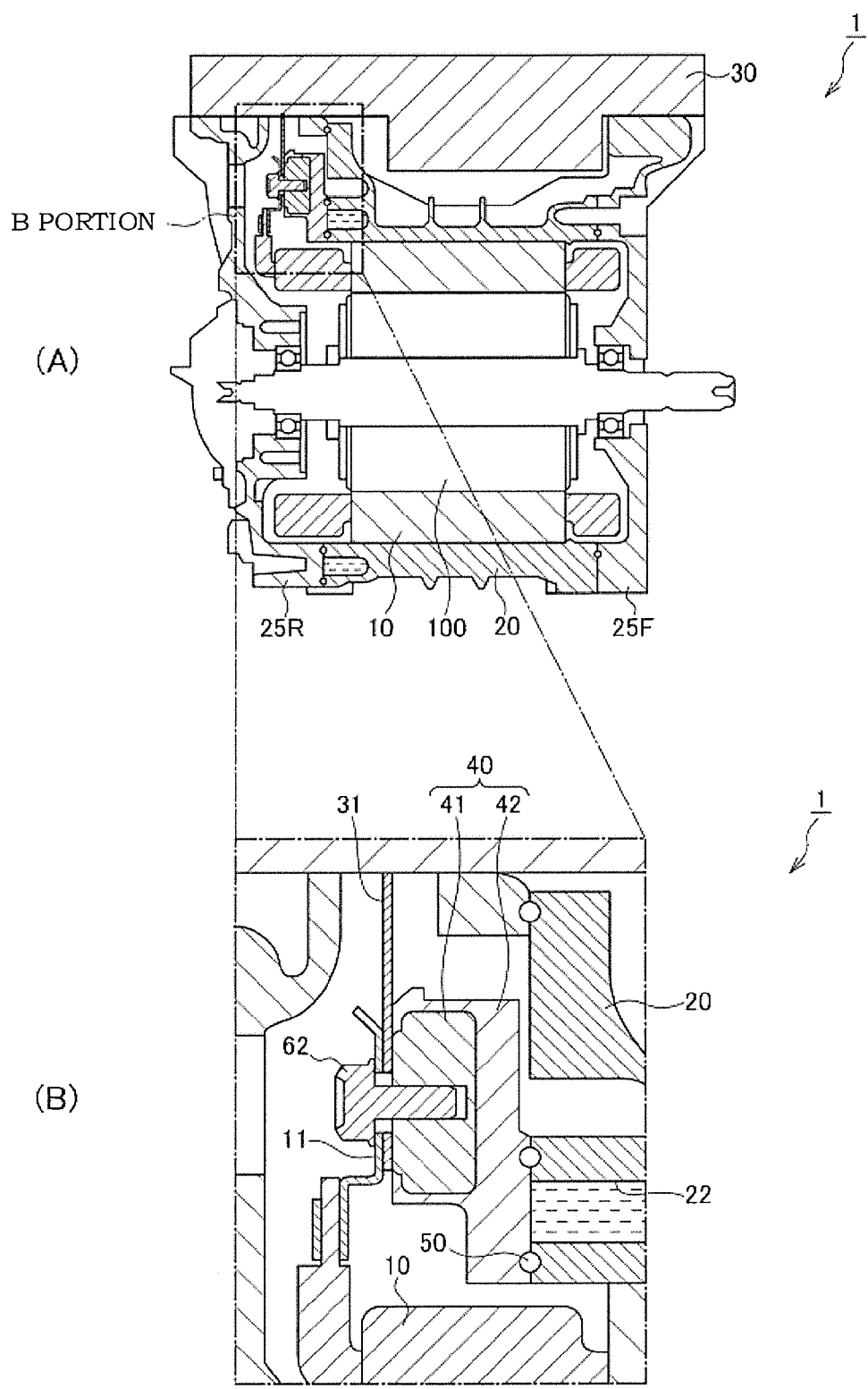
FIG. 2 is a vertical cross-sectional view illustrating the major parts of the cooling structure for the electric motor according to the present invention.

FIG. 2 is a vertical cross-sectional view illustrating the major parts of the cooling structure for the electric motor according to the present invention. FIG. 2(A) is an overall view, and FIG. 2(B) is an enlarged view of a portion B shown in FIG. 2(A).

As shown in FIG. 2(A), the cooling structure 1 for the electric motor according to the present invention mainly includes the stator 10, a rotor 100, the motor case 20, the inverter 30, and the terminal base 40.

The stator 10 and the rotor 100 are housed in the motor case 20. Further, a front cover 25F and a rear cover 25R are attached to the front and back of the motor case 20. The inverter 30 is arranged on the front cover 25F and the rear cover 25R.

Further, as shown in FIG. 2(B), the terminal base 40 is attached so as to close the groove 22 of the motor case 20 while sandwiching the seal member 50 therebetween. The terminal base 40 includes a power line fixing portion 41 and a terminal base body 42.

A female thread is formed on the power line fixing portion 41, and the bolt 62 is to be fastened into the female thread. The bolt 62 fastens the motor power line 11 and the inverter power line 31 together. The bolt 62 is fastened in a state in which the inverter power line 31 is stacked onto the terminal base 40 and the motor power line 11 is further stacked onto the inverter power line 31. The power line fixing portion 41 and the bolt 62 are made of metal such as carbon steel.

The terminal base body 42 is made of resin, for example, and has an electrically insulation property. The terminal base body 42 casts the power line fixing portion 41. This terminal base body 42 closes the groove 22 of the motor case 20.

Figure 3:
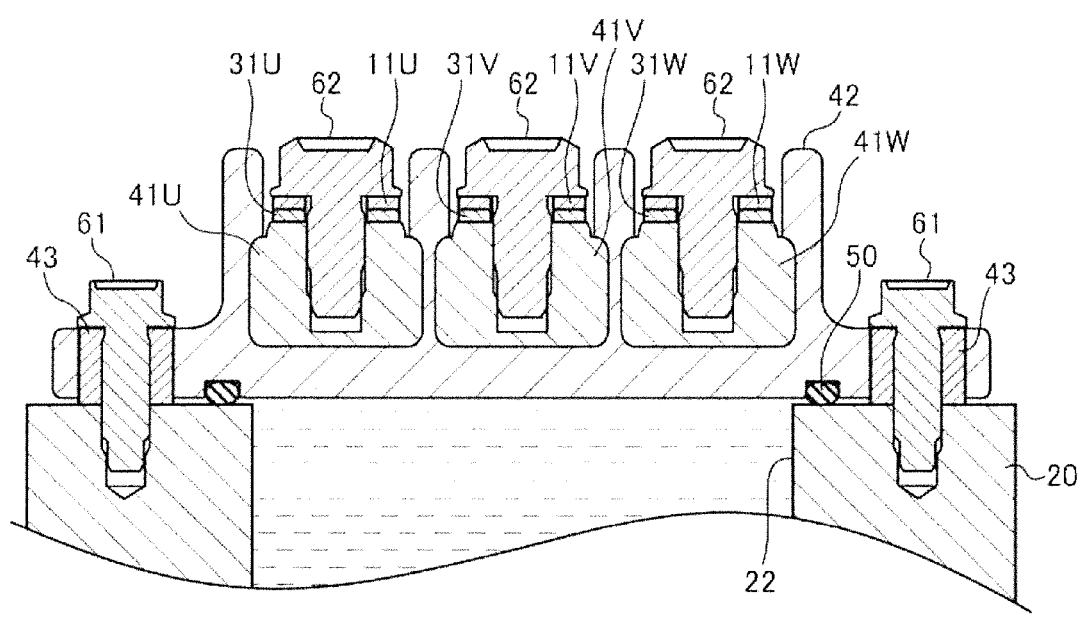
FIG. 3 is an enlarged view of a horizontal cross-section in the vicinity of a terminal base.

FIG. 3 is an enlarged view of a horizontal cross-section in the vicinity of the terminal base.

The terminal base 40 includes a U-phase power line fixing portion 41U, a V-phase power line fixing portion 41V, a W-phase power line fixing portion 41W, and the terminal base body 42. The U-phase power line fixing portion 41U fastens the U-phase motor power line 11U and the U-phase inverter power line 31U together by means of the bolt 62. The V-phase power line fixing portion 41V fastens the V-phase motor power line 11V and the V-phase inverter power line 31V together by means of the bolt 62. The W-phase power line fixing portion 41W fastens the W-phase motor power line 11W and the W-phase inverter power line 31W together by means of the bolt 62. The terminal base body 42 casts the U-phase power line fixing portion 41U, the V-phase power line fixing portion 41V, and the W-phase power line fixing portion 41W. Since they are configured in this manner, the U-phase power line fixing portion 41U, the V-phase power line fixing portion 41V, and the W-phase power line fixing portion 41W are electrically insulated with each other. Further, a metal collar 43 is cast in the terminal base 40. A bolt 61 is inserted through the metal collar 43, and is fastened to the motor case 20.

A structure in which a motor is brought close to (or integrated with) an inverter is known in order to miniaturize a unit. In such a structure, since a power line that connects the motor to the inverter is short, heat from a motor coil is easily conducted to the inverter via the power line. There is a possibility that a semiconductor element within the inverter is broken down in a case where the amount of conducted heat is large.

In contrast, in the present embodiment, the groove 22 that is opened on the end surface 21 of the motor case 20 is formed, and the groove 22 is closed by the terminal base 40 that connects the motor power lines 11 to the inverter power lines 31 to form the cooling water passage. Since they are configured in this manner, the terminal base 40 (the motor power lines 11 and the inverter power lines 31) is directly cooled by the cooling water that flows through the cooling water passage. For this reason, heat from the motor coil is hardly conducted to the inside of the inverter.

Further, in the present embodiment, the bolts 62 are fastened in a state in which the inverter power lines 31 are stacked onto the terminal base 40 and then the motor power lines 11 are stacked onto the inverter power lines 31. Since they are configured in this manner, the inverter power lines 31 can be easily cooled compared to a structure in which the motor power lines 11 are stacked onto the terminal base 40 and the inverter power lines 31 are further stacked onto the motor power lines 11. Therefore, the heat from the motor coil is hardly conducted to the inside of the inverter.

Further, in the structure disclosed in JP2010-268633A, the terminal base and the cooler in which the water passage is incorporated are connected to each other via the L-shaped heat transfer member. For this reason, there is a possibility that a gap is formed between the parts due to variation in accuracy of the part. In a case where a gap is formed, thermal resistance conducted from a surface of the cooler to the terminal base increases, and cooling performance of the power line connected to the terminal base is deteriorated.

In contrast, in the present embodiment, the motor power lines 11 and the inverter power lines 31 are fixed to the terminal base 40, a lower surface of the terminal base 40 is caused to be in the vicinity of an opening of the groove 22, and the terminal base 40 and the periphery of the opening of the groove 22 are fastened in the axial direction. This makes it possible to fasten the terminal base 40 and the periphery of the opening of the groove 22 in one direction.

For this reason, since an L-shaped heat transfer member consisting of two flat plate parts, which is interposed between the cooler and the terminal base, is not necessary unlike JP2010-268633A, it is possible to suppress a gap that may be formed due to the part tolerance. Therefore, the thermal resistance can be decreased, and the cooling performance of the power lines connected to the terminal base can thereby be improved.

In other words, since the terminal base is directly cooled by the cooling water without interposing a heat transfer member in the middle, good cooling performance can be achieved.

The terminal base, which is arranged on the end surface of the motor case while sandwiching a seal member therebetween, is fastened by means of the bolt. Since the seal member is provided in this manner, water leakage from the opening of the groove can be prevented while satisfying the cooling performance.

Second Embodiment

Figure 4:
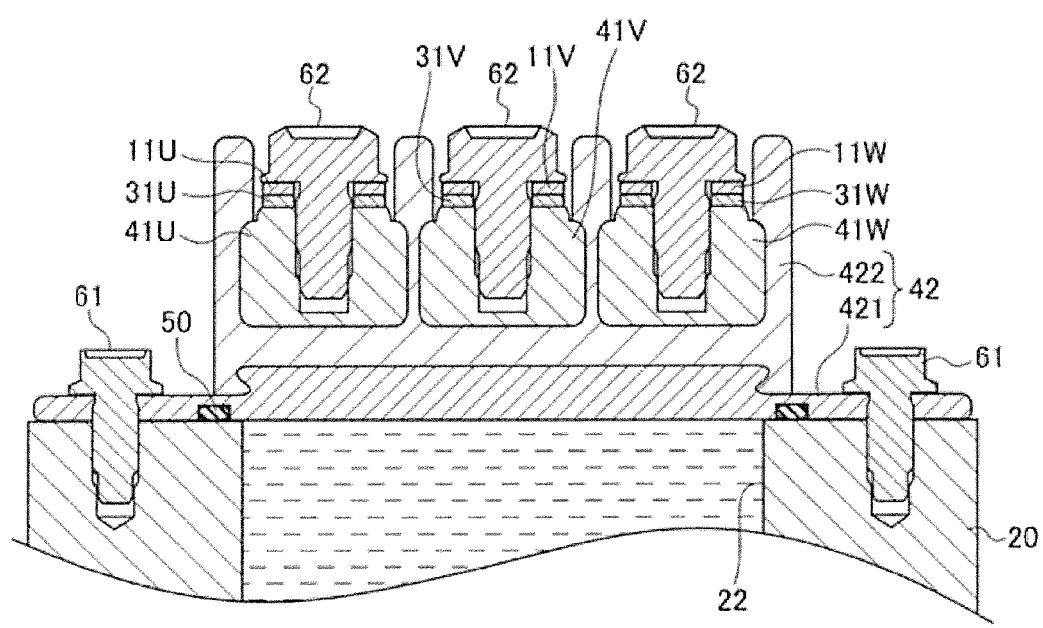
FIG. 4 is a view illustrating the cooling structure for the electric motor according to a second embodiment of the present invention.

FIG. 4 is a view illustrating the cooling structure for the electric motor according to a second embodiment of the present invention, and is an enlarged view of the horizontal cross-section in the vicinity of the terminal base.

Hereinafter, the same reference numerals will be assigned to portions that perform the same functions as those explained above, and repetitive explanation will be omitted appropriately.

The terminal base body 42 according to the present embodiment includes a lid part 421 and a casting part 422.

The lid part 421 is made of metal. The lid part 421 is arranged so as to close the groove 22 of the motor case 20. An upper portion of the lid part 421 is formed so as to expand upward from a base thereof, and the casting part 422 is inserted into this wedge-shaped portion.

The casting part 422 casts the U-phase power line fixing portion 41U, the V-phase power line fixing portion 41V, the W-phase power line fixing portion 41W, and the wedge portion of the lid part 421. The casting part 422 has an electrically insulation property, and is made of a resin, for example.

According to the present embodiment, a cooling water passage is formed by the lid part 421 made of metal, and the cooling water does not come into contact with a resin portion (the casting part 422). For this reason, moisture absorption of the resin portion (the casting part 422) can be avoided. Therefore, the terminal base 40 according to the present embodiment has superior strength and durability performance. In other words, according to the present embodiment, it is possible to provide a terminal base that has high insulation reliability even after use for a long period of time.

Third Embodiment

Figure 5:
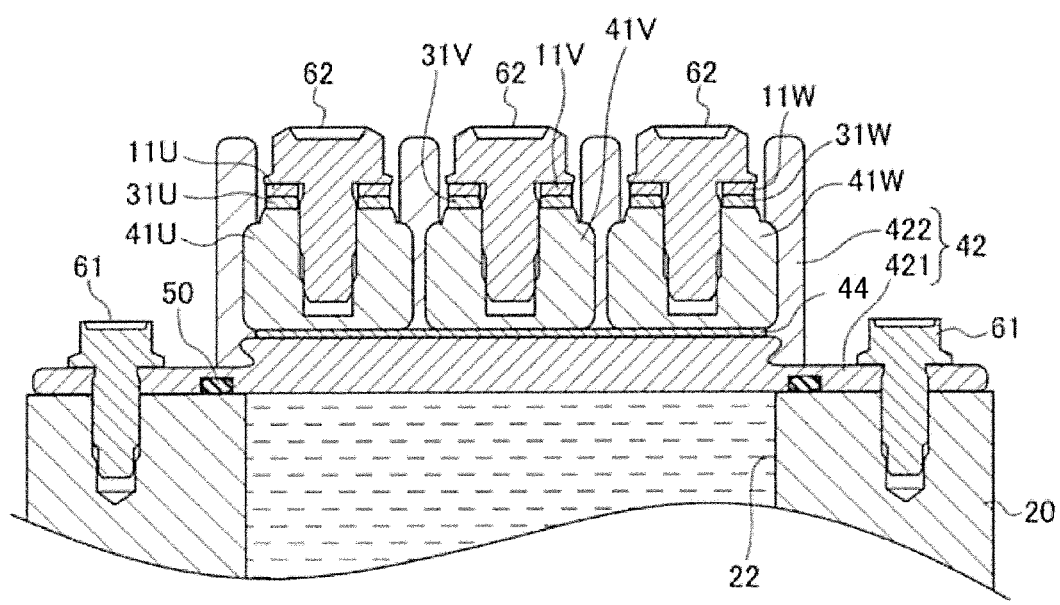
FIG. 5 is a view illustrating the cooling structure for the electric motor according to a third embodiment of the present invention.

FIG. 5 is a view illustrating the cooling structure for the electric motor according to a third embodiment of the present invention, and is an enlarged view of the horizontal cross-section in the vicinity of the terminal base.

The terminal base 40 according to the present embodiment includes an insulating member 44 sandwiched between the power line fixing portion 41 and the lid part 421. The insulating member 44 is a thin plate made of resin, for example.

In the configuration of the second embodiment, it is necessary to pour the resin for the casting part 422 even between the power line fixing portion 41 and the lid part 421. In order to secure flowability of the resin, a certain level of gap has to be provided between the power line fixing portion 41 and the lid part 421. Further, in order to secure strength of the resin between the power line fixing portion 41 and the lid part 421, it is necessary to provide a gap between the power line fixing portion 41 and the lid part 421 to secure a thickness of the resin.

In contrast, according to the constitution of the third embodiment, since the insulating member 44 is provided, it is not necessary to pour resin between the power line fixing portion 41 and the lid part 421. Thus, the power line fixing portion 41 can be brought to the lid part 421. In a case where they can be close together, the thermal conductivity increases, whereby the cooling performance improves. Further, since there is no resin between the power line fixing portion 41 and the lid part 421, securing the strength of the resin is no longer required.

In this regard, it is preferable that the insulating member 44 has higher thermal conductivity than that of the casting part 422. This is because if the thermal conductivity of the insulating member 44 is higher, the heat resistance decreases, and temperature rising of the power lines can be suppressed easily.

Fourth Embodiment

Figure 6:
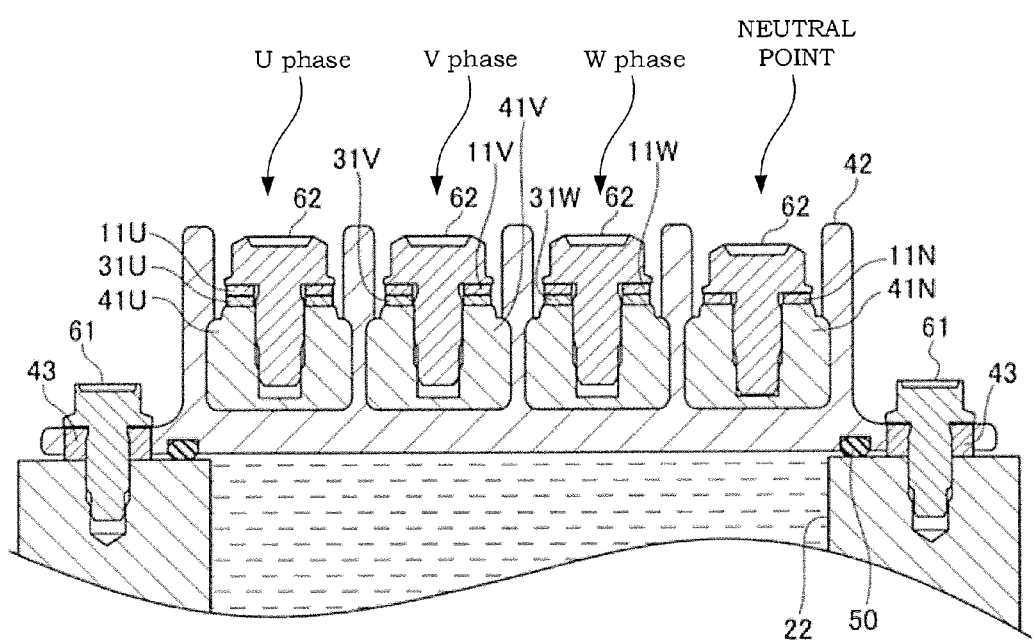
FIG. 6 is a view illustrating the cooling structure for the electric motor according to a fourth embodiment of the present invention.

FIG. 6 is a view illustrating the cooling structure for the electric motor according to a fourth embodiment of the present invention, and is an enlarged view of the horizontal cross-section in the vicinity of the terminal base.

The terminal base 40 according to the fourth embodiment not only includes the U-phase power line fixing portion 41U, the V-phase power line fixing portion 41V, and the W-phase power line fixing portion 41W, but also includes a neutral point power line fixing portion 41N.

By configuring the terminal base 40 in this manner, heat at a neutral point, which is the maximum heat generating point of the motor, can also be extracted, and this makes it possible to improve a performance of continuous output of the motor.

Fifth Embodiment

Figure 7:
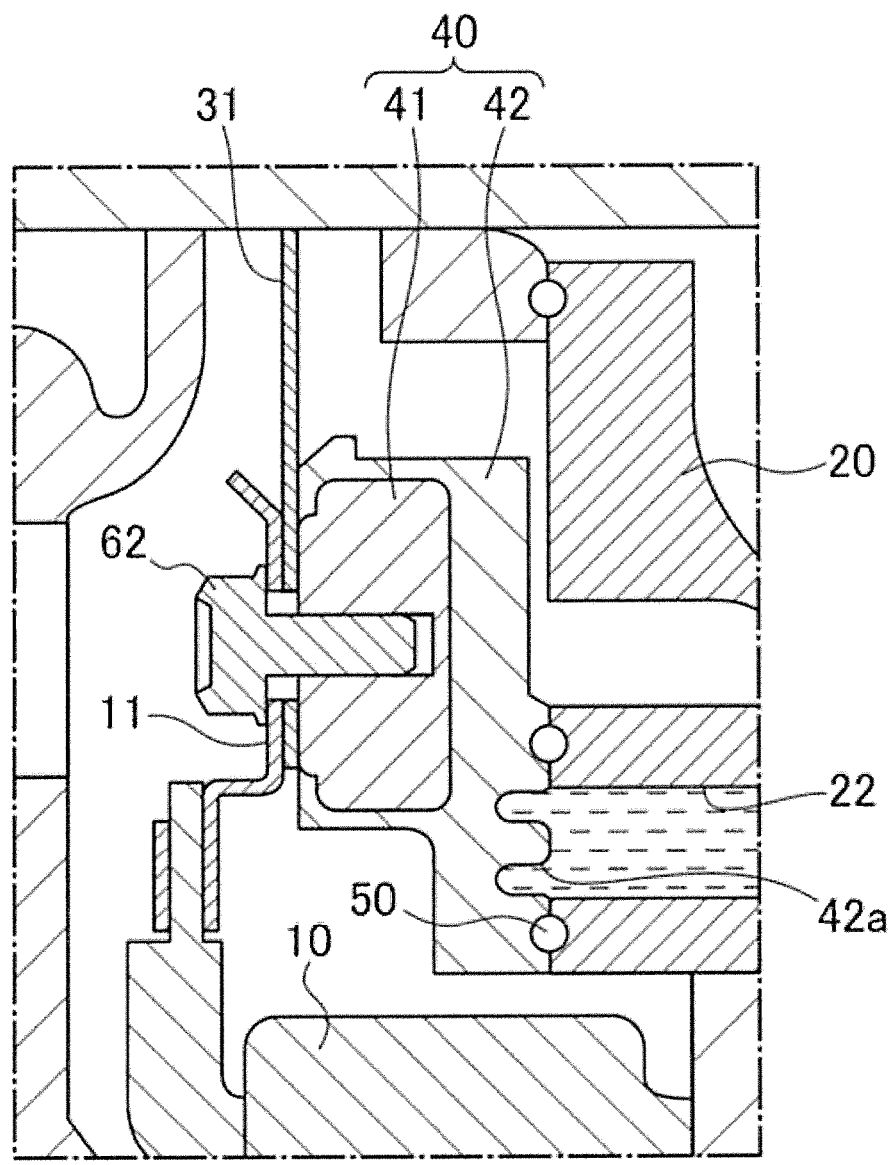
FIG. 7 is a view illustrating the cooling structure for the electric motor according to a fifth embodiment of the present invention.

FIG. 7 is a view illustrating the cooling structure for the electric motor according to a fifth embodiment of the present invention, is an enlarged view of the horizontal cross-section in the vicinity of the terminal base.

In the terminal base 40 according to the present embodiment, a fin 42a is formed on a surface that closes the groove 22.

By configuring the fin 42a in this manner, since a contact area between the terminal base 40 and the cooling water increases, further good cooling performance can be achieved.

In this regard, in a case where a fin is provided in the configuration of the fourth embodiment, the length (height) of the fin corresponding to the neutral point power line fixing part may be longer than the length (height) of the fins corresponding to the three-phase power line fixing parts. By configuring the fins in this manner, the heat at the neutral point, which is the maximum heat generating point of the motor, can be extracted more efficiently.

The cooling structure (1) for the electric motor as explained above includes: the motor case (20) that houses the stator (10) and the rotor therein, the groove (22) that is opened on the end surface in the axis direction of the rotor being formed in the motor case; the motor control circuit (30) attached to the motor case (20); and the terminal base (40) that closes the groove (22) to constitute the groove (22) as a cooling water passage through which cooling water can flow, the terminal base connecting the power lines (11) of the motor and the power lines (31) of the motor control circuit (30). By configuring the cooling structure for the electric motor in this manner, the terminal base 40 (the power lines 11 of the motor and the power lines 31 of the inverter) is directly cooled by the cooling water that flows through the cooling water passage. For this reason, heat from the motor coil is hardly conducted to the inside of the inverter.

As described above, although the embodiments of the present invention have been explained, the above embodiments merely illustrate a part of the application examples of the present invention, and it does not mean that a technical scope of the present invention is limited to the specific constitution of each of the embodiments described above.

For example, in the embodiments described above, the structure in which the terminal base arranged on the end surface of the motor case so as to sandwich the seal member therebetween is fastened with the bolt has been illustrated. However, the present invention is not limited to this structure. The terminal base may be adhered or welded to the motor case without providing a seal member.

Further, the embodiments described above can be combined appropriately.

The present application claims priority based on Japanese Patent Application No. 2012-208456 filed with Japan Patent Office on Sep. 21, 2012, the content of which is incorporated herein by reference in its entirety.

The invention claimed is:

1. A cooling structure for an electric motor, comprising:
   a motor case that houses a stator and a rotor therein, a groove opened on an end surface in an axis direction of the rotor being formed in the motor case;
   a motor control circuit attached to the motor case; and
   a terminal base that closes the groove such that the groove forms a cooling water passage through which cooling water can flow, the terminal base connecting a power line of the motor to a power line of the motor control circuit,
   wherein the terminal base includes a fixing portion configured to fix the power line of the motor and the power line of the motor control circuit such that the power line of the motor and the power line of the motor control circuit are in direct contact.

2. The cooling structure for the electric motor according to claim 1, further comprising:
   a seal member provided around an opening of the groove of the motor case,
   wherein the terminal base is fixed to the motor case by a fastening member in an axial direction of the rotor so as to sandwich the seal member therebetween.

3. The cooling structure for the electric motor according to claim 1, wherein the terminal base includes:
   a lid part that closes the groove;
   a female thread formed in the fixing portion;
   a bolt fastened into the female thread, the bolt being used to fasten the power line of the motor and the power line of the motor control circuit together; and
   a coupling part that integrates the lid part and the fixing portion in an electrically insulated manner.

4. The cooling structure for the electric motor according to claim 3, wherein the terminal base further includes an insulating member sandwiched between the lid part and the fixing portion.

5. The cooling structure for the electric motor according to claim 4, wherein thermal conductivity of the insulating member is higher than that of the coupling part.

6. The cooling structure for the electric motor according to claim 1, wherein the terminal base includes a fin that faces the water cooling passage.

7. The cooling structure for the electric motor according to claim 1, wherein a neutral point of the motor is further connected to the terminal base.

8. The cooling structure for the electric motor according to claim 7, wherein the terminal base includes:
   a first fin provided so as to correspond to a point at which the power line of the motor is connected to the power line of the motor control circuit, the first fin facing the cooling water passage; and
   a second fin provided so as to correspond to a point to which the neutral point of the motor is connected, the second fin facing the cooling water passage, a length of the second fin being longer than that of the first fin.

9. A cooling structure for an electric motor, comprising:
   a motor case that houses a stator and a rotor therein, a groove opened on an end surface in an axis direction of the rotor being formed in the motor case;
   a motor control circuit attached to the motor case; and
   a terminal base that closes the groove such that the groove forms a cooling water passage through which cooling water can flow, the terminal base connecting a power line of the motor to a power line of the motor control circuit,
   wherein the terminal base includes:
      a lid part that closes the groove;
      a power line fixing part in which a female thread is formed, a bolt being fastened into the female thread, the bolt being used to fasten the power line of the motor and the power line of the motor control circuit together; and
      a coupling part that integrates the lid part and the power line fixing part in an electrically insulated manner.

10. A cooling structure for an electric motor, comprising:
   a motor case that houses a stator and a rotor therein, a groove opened on an end surface in an axis direction of the rotor being formed in the motor case;
   a motor control circuit attached to the motor case; and
   a terminal base that closes the groove such that the groove forms a cooling water passage through which cooling water can flow, the terminal base connecting a power line of the motor to a power line of the motor control circuit,
   wherein a neutral point of the motor is further connected to the terminal base, and
   wherein the terminal base includes:
      a first fin provided so as to correspond to a point at which the power line of the motor is connected to the power line of the motor control circuit, the first fin facing the cooling water passage; and
      a second fin provided so as to correspond to a point to which the neutral point of the motor is connected, the second fin facing the cooling water passage, a length of the second fin being longer than that of the first fin.

* * * * *